US007771580B2

(12) United States Patent
Daniel et al.

(10) Patent No.: US 7,771,580 B2
(45) Date of Patent: Aug. 10, 2010

(54) PARTICLE EXTRACTION METHODS AND SYSTEMS FOR A PARTICLE CONCENTRATOR

(75) Inventors: Jurgen H. Daniel, San Francisco, CA (US); Meng H. Lean, Santa Clara, CA (US); Robert Matusiak, Sunnyvale, CA (US); Armin R. Volkel, Mountain View, CA (US); Gregory P. Schmitz, Los Gatos, CA (US); Huangpin B. Hsieh, Mountain View, CA (US); Ashutosh Kole, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1015 days.

(21) Appl. No.: 11/468,523

(22) Filed: Aug. 30, 2006

(65) Prior Publication Data

US 2008/0053828 A1 Mar. 6, 2008

(51) Int. Cl.

| | |
|---|---|
| ***G01N 27/447*** | (2006.01) |
| ***G01N 27/453*** | (2006.01) |
| ***B01D 29/00*** | (2006.01) |
| ***B01D 29/50*** | (2006.01) |
| ***B01D 36/00*** | (2006.01) |
| ***C02F 9/00*** | (2006.01) |

(52) U.S. Cl. ...................... 205/547; 204/643; 210/252; 210/258; 210/322

(58) Field of Classification Search ................. 204/547, 204/643; 210/660, 252, 258, 322
See application file for complete search history.

(56) References Cited

U.S. PATENT DOCUMENTS

| | | | | |
|---|---|---|---|---|
| 7,115,234 | B2 * | 10/2006 | Freitag et al. | 422/130 |
| 7,169,282 | B2 * | 1/2007 | Talary et al. | 204/670 |
| 2004/0251135 | A1 | 12/2004 | Lean et al. | |
| 2004/0251136 | A1 | 12/2004 | Lean et al. | |
| 2004/0251139 | A1 | 12/2004 | Lean et al. | |
| 2005/0123930 | A1 | 6/2005 | Lean et al. | |
| 2005/0123992 | A1 | 6/2005 | Volkel et al. | |
| 2005/0247564 | A1 | 11/2005 | Volkel et al. | |
| 2005/0247565 | A1 | 11/2005 | Hsieh et al. | |
| 2006/0038120 | A1 | 2/2006 | Lean et al. | |

* cited by examiner

*Primary Examiner*—Alex Noguerola
(74) *Attorney, Agent, or Firm*—Fay Sharpe LLP

(57) ABSTRACT

Method and Systems for extracting a concentrated sample of particles include priming a concentrate reservoir by passing a fluid through the concentrate reservoir to remove air. The concentrate reservoir has a first end with an opening and second end with an opening. The second end of the concentrate reservoir is closed off, and particles are accumulated within the concentrate reservoir by use of a particle concentrator. Thereafter, the first end of the concentrate reservoir is closed off, isolating the concentrate reservoir from particle concentrator, from which the particles were obtained. The second end of the concentrate reservoir is thereafter opened, and the particles of the concentrated sample in the concentrate reservoir are extracted to a sample capture reservoir through the second end opening of the concentrate reservoir.

16 Claims, 13 Drawing Sheets

PARTICLE EXTRACTION METHODS AND SYSTEMS FOR A PARTICLE CONCENTRATOR

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W911NF-05-C-0075 awarded by the U.S. Army.

BACKGROUND

The present application relates to the field of particle concentrators, and more particularly, to improving extraction of organic, inorganic and/or biological particles concentrated by a particle concentrator employing traveling wave grids.

It is desirable to move and concentrate particles in a sample for a variety of reasons. For example such movement is useful in applications related to, among others, analysis of proteins and DNA fragment mixtures, and methodologies used for processes such as DNA sequencing, isolating active biological factors associated with diseases such as cystic fibrosis, sickle-cell anemia, myelomas, and leukemia, and establishing immunological reactions between samples on the basis of individual compounds. Movement by traveling wave grids is an extremely effective tool because, among other attributes, it does not affect a molecule's structure, is highly sensitive to small differences in molecular charge and mass, and will not damage the cells of biological materials. Thus, particle concentrators employing traveling wave grids are useful not only for micron-sized particles but also having sufficient sensitivity for molecular transport.

Traveling wave grids manipulate particles by subjecting them to traveling electric fields. Such traveling fields are produced by applying appropriate voltages of suitable frequency and phase to electrode arrays of suitable design, such that non-uniform electric fields are generated.

Thus, by use of traveling wave grids, particles are manipulated and positioned at will without physical contact, leading to new methods for focusing, separation and concentration technology. In many applications, once the particles are sufficiently concentrated, it is useful to move the concentrate sample of particles to analytical devices for investigation and experimentation.

It has been noted, however, that with existing and previously proposed particle concentrators, including both those relying on traveling wave grid technology, as well as others, once the particles are concentrated, moving the particles in the concentrated sample from the particle concentrator raises its own set of issues.

Particularly, extracting a concentrated sample of particles from a collection chamber in a traveling wave grid device built on a micro-fluidic scale, can be challenging, partly because the particles (e.g., organic, inorganic or other biomaterials) may stick to the walls of the collection chamber, or to the traveling wave surface, or may become diluted if the extraction is not performed carefully.

Presently, the most common method of sample extraction/transfer is manually performed in a laboratory where the sample is simply collected using a pipette tip. Particularly, a person will attempt to identify an area having a high concentration of particles, and will simply collect particles by inserting the pipette tip into this location.

However, manual pipette extraction is a slow, tedious endeavor, causing a bottleneck in the attempt to increase the throughput of samples for analytical investigation and experimentation, and also results in inconsistent extraction wherein samples may be undesirably diluted. A further issue in addition to low collection rates and potential dilution of the sample by this process, is that it is not integrated into the concentrator system. The lack of integration is a stumbling block to providing a consistent extraction process.

INCORPORATION BY REFERENCE

U.S. Patent Application Publication No. US2004/0251135A1 (U.S. Ser. No. 10/459,799, Filed Jun. 12, 2003), published on Dec. 16, 2004, by Meng H. Lean et al., and entitled, "Distributed Multi-Segmented Reconfigurable Traveling Wave Grids for Separation of Proteins in Gel Electrophoresis"; U.S. Patent Application Publication No. US2005/0247564A1 (U.S. Ser. No. 10/838,570, Filed May 4, 2004), published on Nov. 10, 2005, by Armin R. Volkel et al., and entitled, "Continuous Flow Particle Concentrator"; U.S. Patent Publication No. US2005/0247565A1 (U.S. Ser. No. 10/838,937; Filed May 4, 2004), published on Nov. 10, 2005, by Hsieh et al., and entitled, "Portable Bioagent Concentrator"; U.S. Patent Application Publication No. US2004/0251139A1 (U.S. Ser. No. 10/460,137, Filed Jun. 12, 2003), published on Dec. 16, 2004, by Meng H. Lean et al., and entitled, "Traveling Wave Algorithms to Focus and Concentrate Proteins in Gel Electrophoresis"; U.S. Patent Application Publication No. US2005/0123930A1 (U.S. Ser. No. 10/727,301, Filed Dec. 3, 2003), published on Jun. 9, 2005, by Meng H. Lean et al., and entitled, "Traveling Wave Grids and Algorithms for Biomolecule Separation, Transport and Focusing"; U.S. Patent Application Publication No. US2005/0123992A1 (U.S. Ser. No. 10/727,289, Filed Dec. 3, 2003), published on Jun. 9, 2005, by Volkel et al., and entitled, "Concentration and Focusing of Bio-Agents and Micron-Sized Particles Using Traveling Wave Grids"; U.S. Patent Application Publication No. US2004/0251136A1 (U.S. Ser. No. 10/460,724, Filed Jun. 12, 2003), published on Dec. 16, 2004, by Meng H. Lean et al., and entitled, "Isoelectric Focusing (IEF) of Proteins With Sequential and Oppositely Directed Traveling Waves in Gel Electrophoresis"; and U.S. Patent Application Publication No. US2006/0038120A1 (U.S. Ser. No. 10/921,556, Filed Aug. 19, 2004), published Feb. 23, 2006, by Meng H. Lean et al., and entitled "Sample Manipulator", each hereby incorporated herein by reference in their entireties.

BRIEF DESCRIPTION

Method and Systems for extracting a sample of concentrated particles include priming a concentrate reservoir by passing a fluid through the concentrate reservoir to remove air. The concentrate reservoir has a first end with an opening and second end with an opening. The second end of the concentrate reservoir is closed off, and particles are accumulated within the concentrate reservoir by use of a particle concentrator. Thereafter, the first end of the concentrate reservoir is closed off, isolating the concentrate reservoir from particle concentrator, from which the particles were obtained. The second end of the concentrate reservoir is thereafter opened, and the particles of the concentrated sample in the concentrate reservoir are extracted to a sample capture reservoir through the second end opening of the concentrate reservoir.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
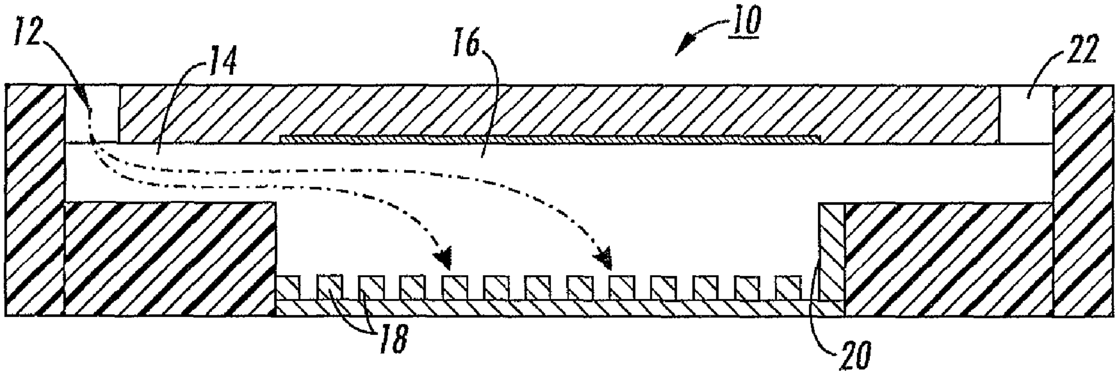
FIG. 1 is a cross-sectional view of a continuous flow particle concentrator utilizing field flow fractionation.

Turning now to FIG. 1, depicted is an existing concept for a particle concentrator 10, having a sample volume of fluid flowing through a concentration cavity over a period of time. It is to be understood fluid may at times be used herein to include liquids, as well as gases (including air). Flow inlet 12 is designed to have purely laminar flow into cavity 14, with fluid expansion into a wider cavity 16 in which the particles respond to the applied electric field of traveling wave grid 18. The vortex of recirculation created at the bottom right corner of the flow cell localizes or allows particles to accumulate. A transverse (vertical) electric field is applied to deflect particles in the flow stream down towards the traveling wave grid 18 on the floor of the recessed cavity. Traveling wave voltages then move particles to the right wall where a second orthogonal traveling wave grid 20, which could be co-planar, concentrates the particles to one corner (out of plane, e.g., coming out of the page) for sample collection at sample collection area 22, which is the fluid exit area.

In device 10, charged particles deposit on traveling wave grid 18 in bands specified by their mobility or charge over size, with the higher mobility particles forming bands more to the left. This effect is known as field-flow fractionation. Depending on the medium above the grid and the desired application, charged particles may be either accumulated in a single line at one end of the grid, or in individual lines parallel to the grid depending on specific parameters of the particles and the type of waveform applied to the traveling wave grid. By combining two traveling wave grids such that the electrodes of the two grids extend in a perpendicular fashion to each other, the particles may be further concentrated into a single region. To achieve a higher particle concentration, the focusing may be performed in a high-viscosity medium, e.g. a gel. Examples of such devices have been described in the materials incorporated by reference in this document.

As can be appreciated from the above, existing particle concentrators do not provide any efficient, consistently repeatable, integrated manner to extract the particles of the concentrated sample from the particle concentrator so they may be efficiently transferred to analytical devices for investigation and experimentation.

Figure 2:
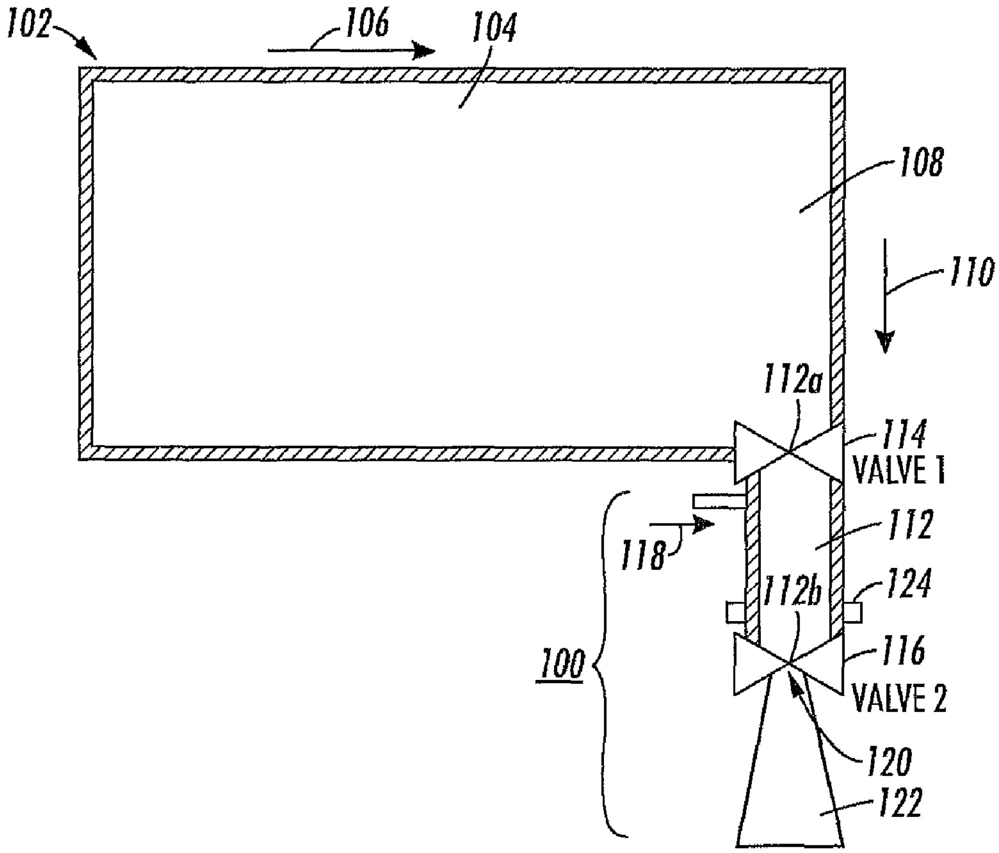
FIG. 2 illustrates a first block structure for extracting a concentrated sample in accordance with the concepts of the present application.

Turning to FIG. 2, illustrated is a first embodiment of an arrangement by which improved extraction and transfer of particles of a concentrated sample in a particle concentrator may be achieved. More particularly, in the top view of FIG. 2, illustrated is a block representation of an extraction mechanism 100 used in cooperation with a particle concentrator 102, such as one which includes a traveling wave grid within a fluid flow chamber 104. Similar to existing systems employing the traveling wave grid concepts, particles, including organic, inorganic and other bio-materials, are motivated in a first direction 106 in order to move the particles from a low concentration to a high local concentration, such as in area 108. Thereafter, through the use of additionally provided, transversely operational traveling wave grid mechanisms, the particles are moved in a second direction 110 into concentrate reservoir 112 having first end 112*a* with an opening, and second end 112*b*, with an opening. Concentrate reservoir 112 may be sized to hold a variety of amounts of fluid. In one design where the particle concentrator is a microfluidic system, the concentrate reservoir may be sized to hold from approximately 1.5 milliliters to 10 microliters of fluid, and in at least one embodiment approximately 300 microliters.

In the present embodiment, extraction mechanism 100 includes a first valve (valve1) 114, a second valve (valve2) 116, venting mechanism 118, extraction port 120 and sample capture reservoir 122. In this embodiment, sample capture reservoir is shown as a pipette tip. It is to be appreciated however that other configurations may be used, including a capillary, round tube, custom designed tube, or any other appropriate component having an interior area capable of holding a concentrated sample of particles.

Valve1 is located at the entrance or first end of concentrate reservoir 112, and valve2 is located near its exit or second end. Valve1 114 may be a mechanical valve such as a shutter, or it may be an impedance valve based on different fluidic impedances existing due to fluid entering and exiting concentrate reservoir 112. In addition to these valves, any other type of valve used in fluidic or micro-fluidic applications, such as a valve based on air pressure, phase change material or other designs, may also be used.

Valve2 116, located at the exit of concentrate reservoir 112, may be configured of valve types similar to those of valve1. However, valve2 may also be integrated or connected to the sample capture reservoir 122 in situations where sample capture reservoir 122 is directly connected to concentrate reservoir 112.

In addition, and as will be described in greater detail below, concentrate reservoir 112 may have acting upon it an agitation mechanism 124 to agitate the fluid sample located within the reservoir. In one embodiment, the agitation mechanism may be an ultrasonic agitator such as those described in the material incorporated by reference and where agitation can occur along the traveling wave grid. An alternative agitation process is described in the discussion related to FIG. 13. Moving fluid from concentrate reservoir 112 to sample capture reservoir 122 is accomplished by a variety of mechanisms, including aspirating the fluid, or pushing the fluid out of the concentrate reservoir into the sample capture reservoir.

The channel height for the particle concentrator is, in one embodiment, in the range of 0.5 to 2 millimeters. For a field-flow-fractionation the reason for the shallow height is the applied electric field that pushes the particles towards the traveling wave grid. Since a strong field at a low voltage is desired, the height of the channels should be low. Moreover, once the particles are concentrated, most are on the traveling wave grid which is at the bottom of the chamber. A very high extraction chamber would mean unnecessary dilution when the particles are agitated before extraction.

Venting mechanism 118 is connected in operative association with the concentrate reservoir at a location near valve1 114 to allow for maximum displacement of the concentrate due to conservation of volume during the extraction process. Venting mechanism 118 may also be used to backfill concentrate reservoir 112 either with air or a liquid as the particles in the concentrated sample are extracted to the sample capture reservoir.

Figure 3:
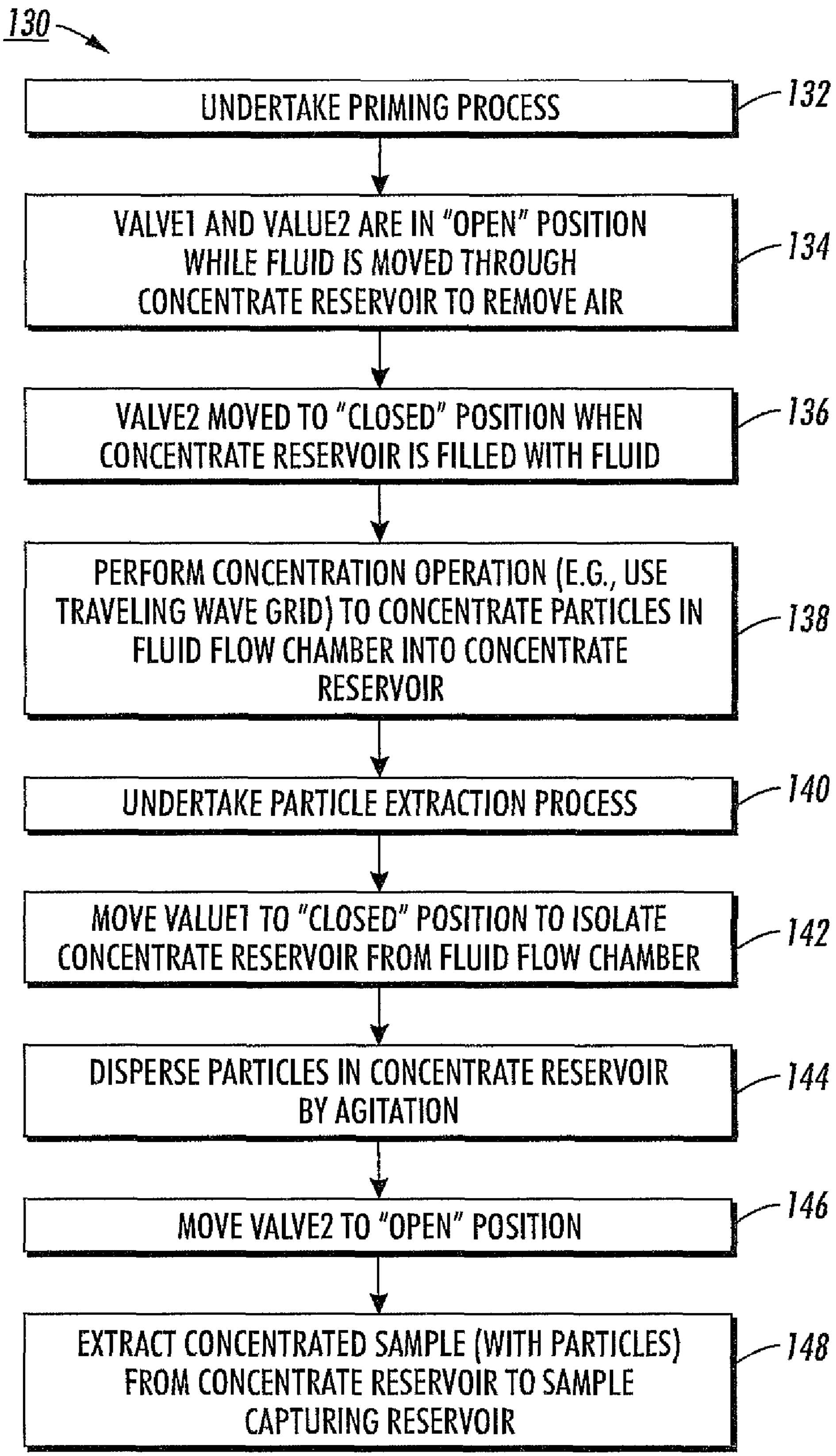
FIG. 3 provides a process sequence for the extraction process.

With attention to FIG. 3, set forth is a process flow 130 for extracting the concentrated sample from the concentrate reservoir shown in FIG. 2. Initially, a priming of the extraction mechanism, including the concentrate reservoir, is undertaken (step 132). Priming is valuable to flush out any undesirable contaminates and to remove air from the concentrate reservoir. Initially, valve1 and valve2 are positioned in an open state (step 134) to permit fluid to fill the concentrate reservoir, removing any trapped air. Next, once the concentrate reservoir has been filled with liquid, valve2 is positioned to a closed state (step 136). Following the closing of valve2, operation of the particle concentrator is undertaken (step 138), such as by operation of a traveling wave grid. This operation acts to concentrate the particles into the concentrate reservoir. Thereafter, a sample extraction process is begun (step 140). This process includes closing valve1 to isolate the concentrate reservoir from the fluid flow chamber (step 142). Next, an optional step of agitating fluid within the concentrate reservoir may be performed to disperse particles that have become lodged on a surface or bottom of the concentrate reservoir (step 144). Agitation is intended to increase the amount of particles in the concentrate sample which will be extracted. Thereafter, valve2 is moved to an open position (step 146), and the concentrate sample (fluid within the concentrate reservoir) is extracted to a sample capture reservoir (step 148).

Figure 4:
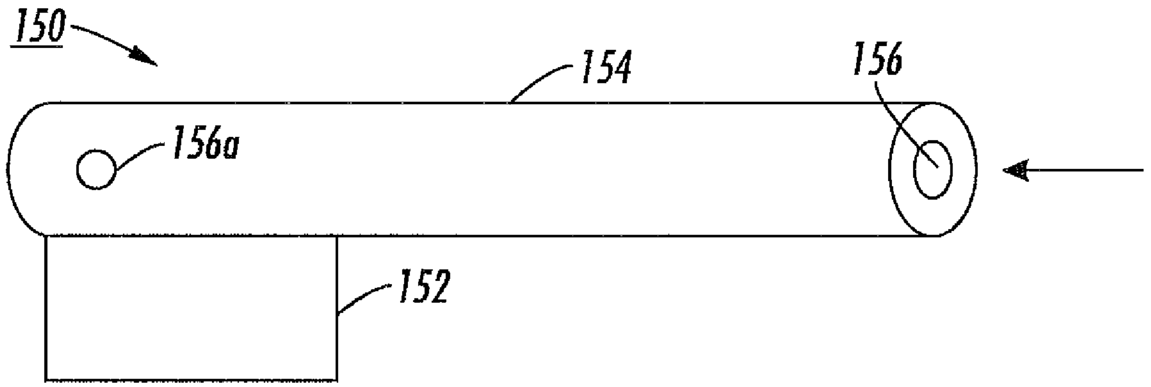
FIG. 4 shows examples of a valve mechanism for valve1 in FIG. 2.

As mentioned previously, valve1 may be configured in a variety of designs. FIG. 4 illustrates valve1 in a flap valve1 150 embodiment. Flap valve1 150 consists of flap portion 152, which may be a flexible polymer or other flexible material. Flap 152 is attached (e.g., glued, molded or otherwise attached) to a rod 154, which in some embodiments may be hollow 156 and have an aperture/opening 156*a* located near flap 152. In one design, rod 154 is embedded (e.g., with elastomeric silicon gel, etc.) into a plastic frame at a position between the fluid flow chamber (104 of FIG. 2) and concentrate reservoir (112 of FIG. 2). As noted in FIG. 2, valve1 is located between these two areas and is used to isolate fluid flow chamber 104 and concentrate reservoir 112 from each other.

Attaching rod 154 via the use of a silicon gel provides good sealing properties and allows the rod to be rotated by approximately 90° or more. By this design, flap valve 150 may be externally rotated to open or close the first opening 112*a* of concentrate reservoir 112, wherein when in a closed position, flap 152 blocks fluid flow into the concentrate reservoir, and when the flap is opened, fluid flow proceeds to the concentrate reservoir (i.e., during the concentrate operation).

Figure 5A:
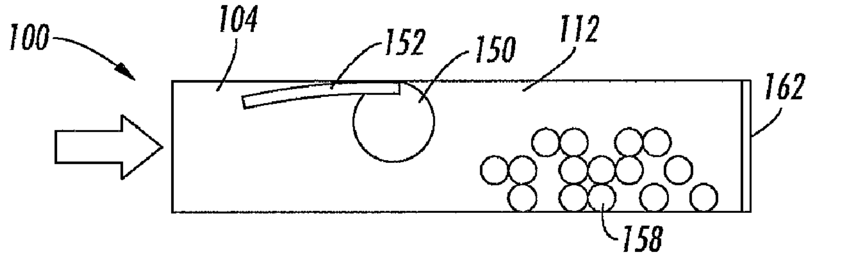
FIGS. 5A-5B depict an embodiment of valve1 as a flap valve mechanism of FIG. 4, combined with a pressure driven extraction method operating in the concentration mode and extraction mode.
Figure 5B:
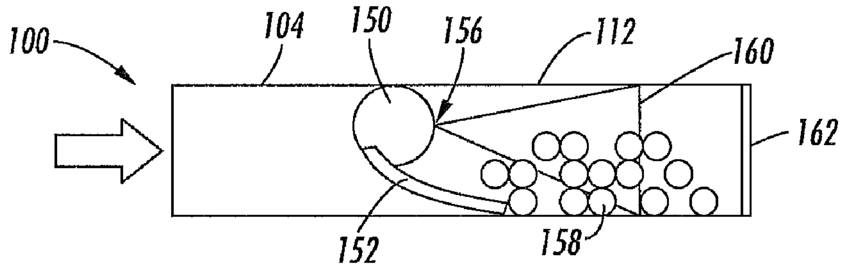

Turning to FIGS. 5A and 5B, illustrated are side views of the flap valve1 150 integrated within extraction mechanism 100 between fluid flow chamber 104 and concentrate reservoir 112. FIG. 5A illustrates a time when the process is in a concentration mode, where the traveling wave grid is in operation, flap valve1 150 is in an open position, and particles 158 are being concentrated into concentrate reservoir 112. FIG. 5B illustrates an extraction mode of the process. At this time, flap valve1 150 is rotated so flap 152 acts to block or isolate fluid flow chamber 104 and concentrate reservoir 112 from each other. Once concentrate reservoir 112 is isolated, a jet of air 160 is initiated through rod 154 (see FIG. 4), via an air-jet generator (not shown), such that jet of air 160 is expelled through flap valve aperture/opening 156. This action moves particles 158 out of concentrate reservoir nozzle/aperture 162 into a sample capture reservoir, such as 122 in FIG. 2 (not shown in FIGS. 5A, 5B).

Figure 5C:
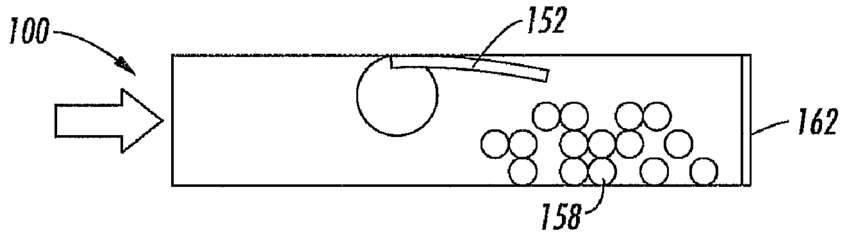
FIGS. 5C and 5D show the flap valve and pressure driven extraction configuration, where the flap valve is rotated in an opposite direction from FIGS. 5A and 5B.
Figure 5D:
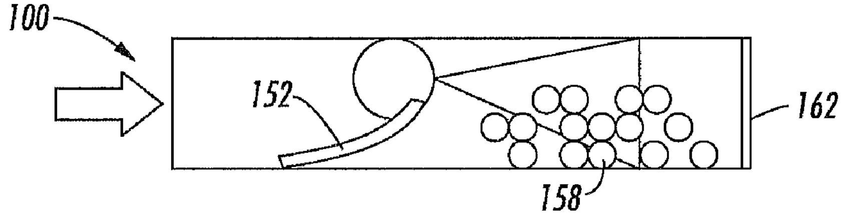

FIGS. 5C and 5D are cross-sectional views, similar to FIGS. 5A, 5B, where, however, the rotation direction of flap valve1 150 is opposite that of FIGS. 5A and 5B.

Figure 6A:
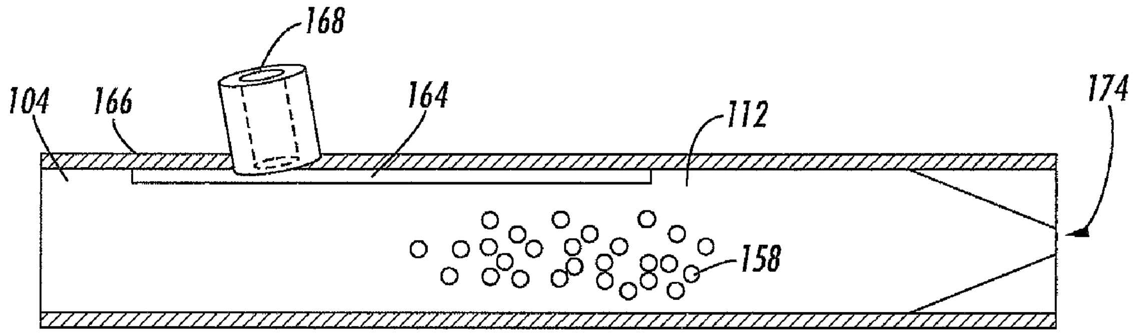
FIGS. 6A and 6B illustrate another flap valve configuration used in a concentration mode and extraction mode.
Figure 6B:
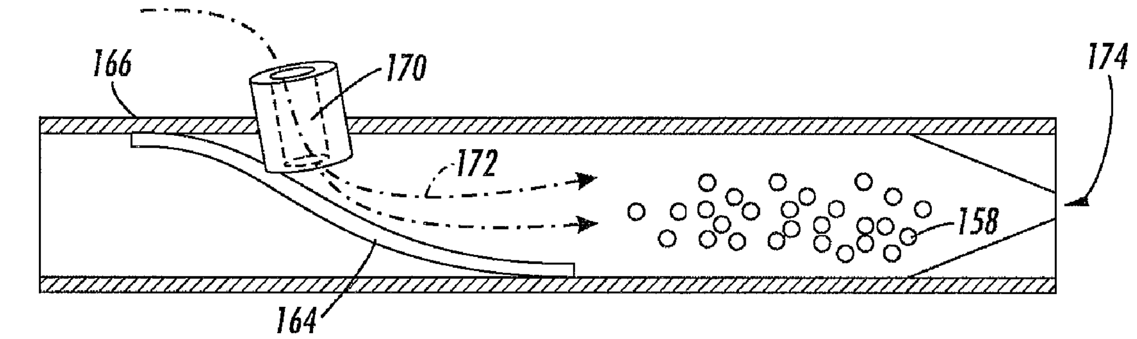
Figure 7:
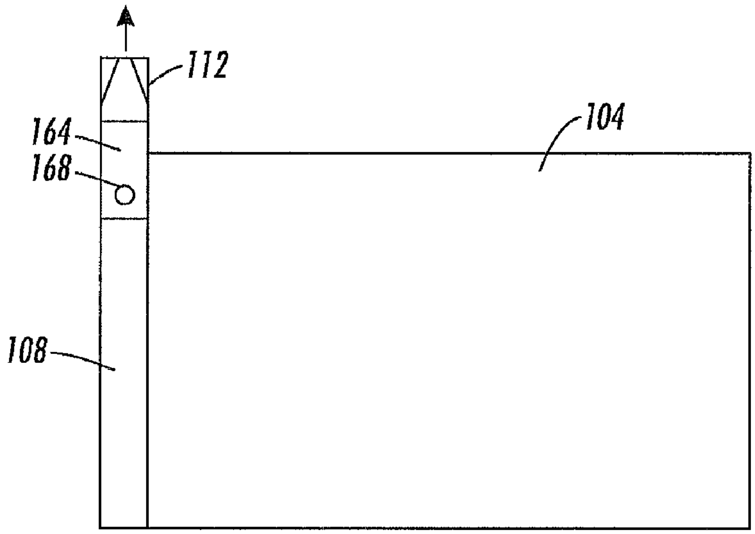
FIG. 7 depicts a top view of the arrangement shown in FIGS. 6A and 6B.

Attention is now directed to FIGS. 6A and 6B, which illustrate another flap valve embodiment. Flap 164 is pinned at location 166 to an upper, inner surface of fluid flow chamber 104, and tube 168 is located within an opening on the upper surface of concentrate reservoir 112. Tube 168 is formed with an inner opening 170 through which air may be supplied. FIG. 6A, depicts a time when the process is in a concentration mode and flap 164 is in an open state allowing movement of particles 158 into concentrate reservoir 112. When the process moves into the extraction mode, as shown in FIG. 6B, tube 168 is motivated in a downward direction, causing flap 164 to close off the path between fluid flow chamber 104 and concentrate reservoir 112. Then a jet of air 172 from an air-jet generator (not shown) is passed through inner opening 170 (which may be defined by elongated tubing such as tygon tubing), thereby moving particles 158 out of concentrate reservoir nozzle/aperture 174 into a sample capture reservoir, such as 122 in FIG. 2. FIG. 7 shows a top view of the concepts disclosed in FIGS. 6A, 6B.

In the examples shown in FIGS. 5B, 5D and 6B, if the pressure of the air flow is adjusted correctly, an ink-jet type ejection of the concentrate sample (containing the concentrated particles) is achieved. Also, while the above has described the fluid used to move the particles as being air, other fluids may be used, for example, an oil or any other fluid which would not dilute the concentrated sample fluid may be employed to move the particles. The extraction ports (i.e., nozzle/aperture) in these figures would of course be fitted with a valve2 as discussed in connection with FIG. 2.

Figure 8A:
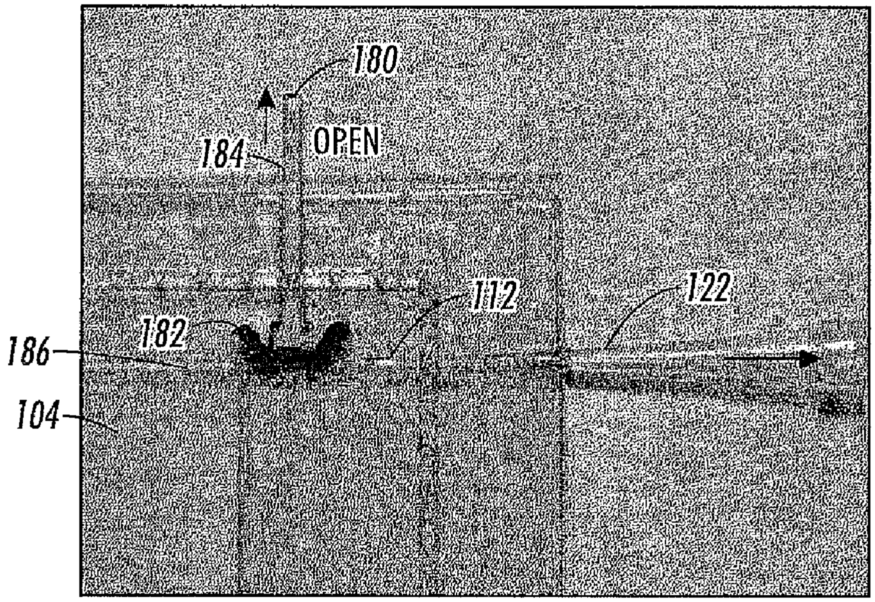
FIGS. 8A and 8B depict an alternative embodiment for valve1 of FIG. 2.
Figure 8B:
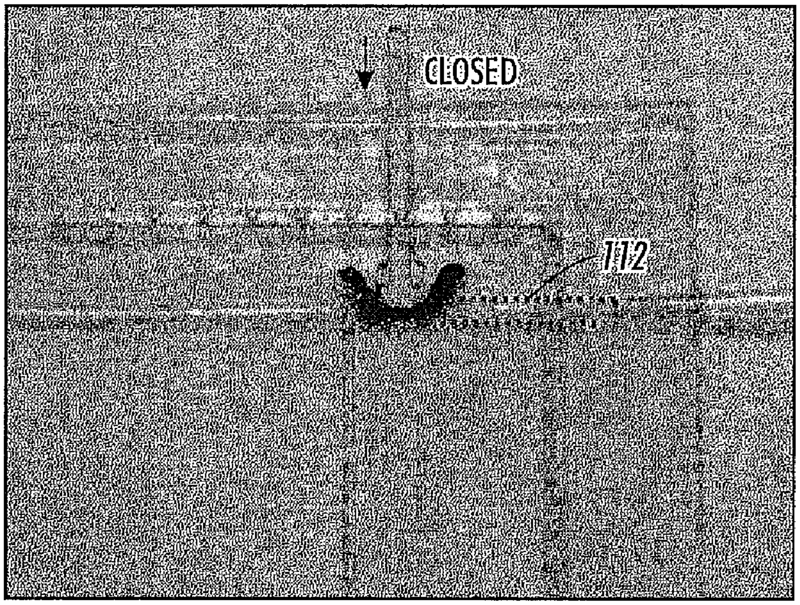

Turning to FIGS. 8A and 8B, illustrated is a further valve concept (such as valve1 of FIG. 2). In this embodiment, valve1 180 employs sealing membrane 182, and linear actuator 184. In FIG. 8A, linear actuator valve1 180 is depicted in an open position, where fluid path 186 between fluid flow chamber 104 and concentrate reservoir 1 12 exists, and therefore the process is in the concentration mode. When, however, the process moves to the extraction mode, linear actuator valve1 180 is moved to a closed position, whereby linear actuator 184 is moved down such that sealing membrane 182 is interposed into fluid path 186, thereby isolating concentrate reservoir 112 from fluid chamber 104.

Figure 9A:
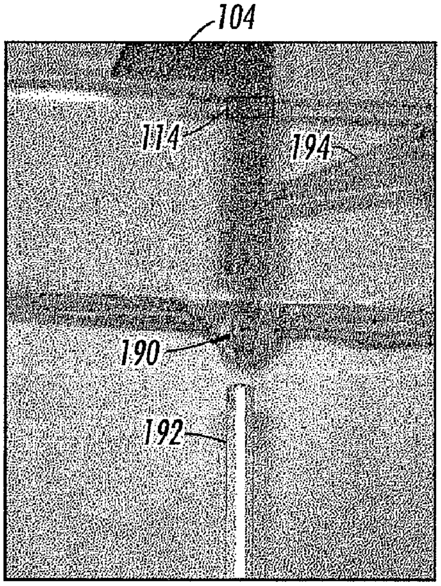
FIGS. 9A-9C show an extraction configuration for extraction of fluid from the concentrate reservoir.
Figure 9B:
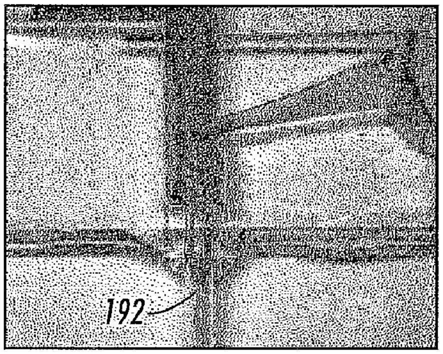
Figure 9C:
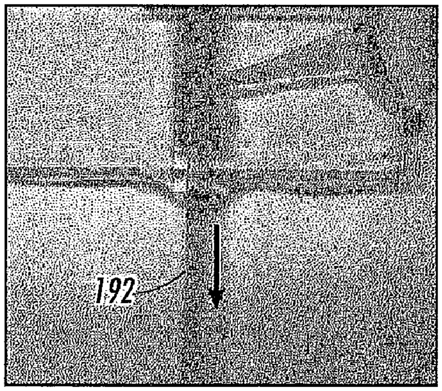

FIGS. 9A-9C, illustrate an embodiment where the process has moved to the extraction mode, and the concentrate sample within the concentrate reservoir is to be extracted to a sample capture reservoir. In this embodiment, valve1 114 is in a closed position, which has isolated concentrate reservoir 112 from fluid flow chamber 104. In FIG. 9A fluid is maintained within concentrate reservoir 112 due to valve2 (i.e., such as valve2 (116) of FIG. 2) formed as a polymer fitting 190. In this example, polymer fitting valve 190 has a capillary tube 192 inserted therein, as shown in FIG. 9B. In this instance, capillary tube 192 is sufficiently hydrophobic such that fluid will not be immediately extracted into the capillary. To cause movement of the fluid from concentrate reservoir 1 12, the fluid is aspirated (e.g., by use of the Venturi principle) by creating a negative atmospheric pressure at an opposite end (not shown) of the capillary. One procedure to create the negative atmosphere is by blowing a stream of air past the opposite end of the capillary so the sample is drawn into the capillary, as shown in FIG. 9C. As in other embodiments, the fluid inside the concentrate reservoir may be agitated by an agitation mechanism (not shown). In one embodiment, agitation is achieved by moving the fluid within concentrate reservoir 112 back and forth, for example by pulsating/varying the pressure on the capillary tube. Lateral chamber 194 of FIGS. 9A-9C serves as a venting mechanism, which in one embodiment may use an expanded polytetrafluorethylene film (such as that known as Gore-Tex®, from W.L. Gore & Associates) that permits air to pass but restricts fluid flow.

Figure 10:
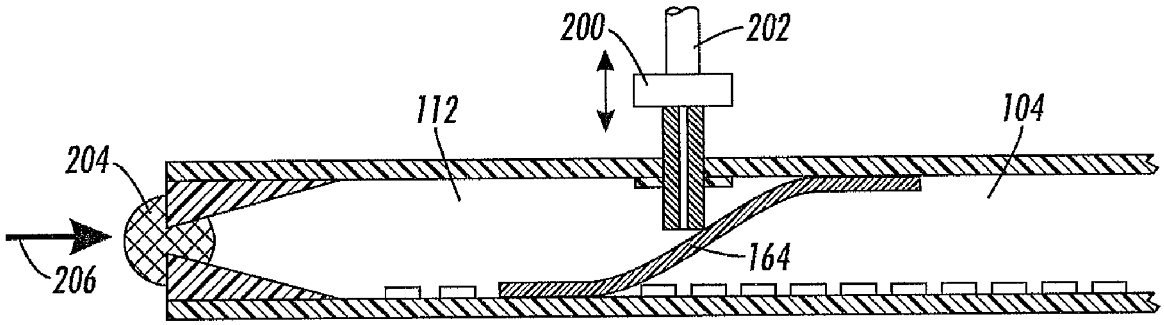
FIG. 10 illustrates a flap valve embodiment similar to FIGS. 6A and 6B, and further using an air passing/liquid restraining valve as valve2.

With attention now being directed to FIG. 10, illustrated is a side view of portions of an extraction mechanism, employing a flap valve 164 as previously described. An actuator 200 with an inlet tube 202 is positioned on a side of the concentrate reservoir 112. Actuator 200 may be used with inlet tube 202 to aspirate the sample, or may serve as air or other fluid inlet (i.e., a venting mechanism). This embodiment further employs a plug 204, to function as valve2. Plug valve 204 is made of a hydrophobic membrane material, which will let air pass but will block fluid flow, such as a membrane of Gore-Tex®. In this embodiment, plug valve 204 may also act as a venting mechanism in the situation where the concentrated sample is aspirated through the vertical inlet tube 202. Otherwise plug valve 204 is used as the extraction port. In such an embodiment, a tube needle 206 is passed through plug valve 204 into concentrate reservoir 112. This design would be considered a single use device, since once the needle tube 206 has punctured plug valve 204, fluid will not be able to be restrained by the plug valve.

Figure 11:
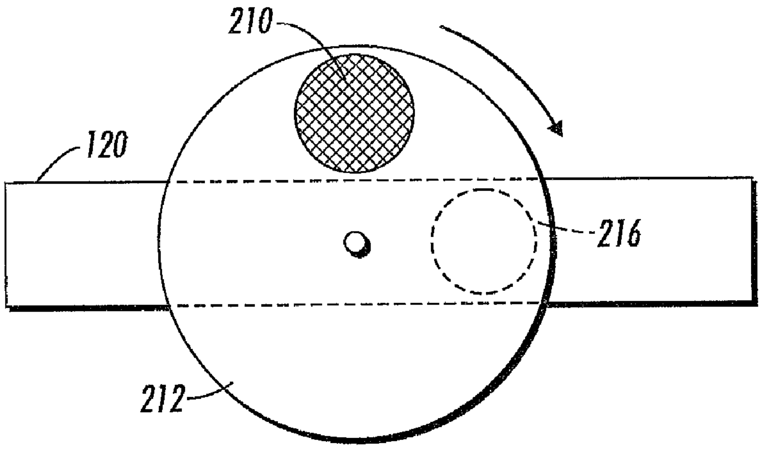
FIG. 11 illustrates a further embodiment for a valve2 of FIG. 2.
Figure 12:
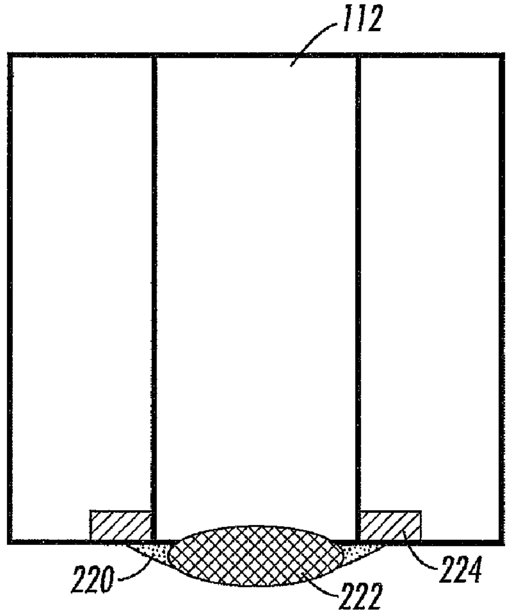
FIG. 12 illustrates an alternative embodiment of valve2 of FIG. 2.
Figure 13:
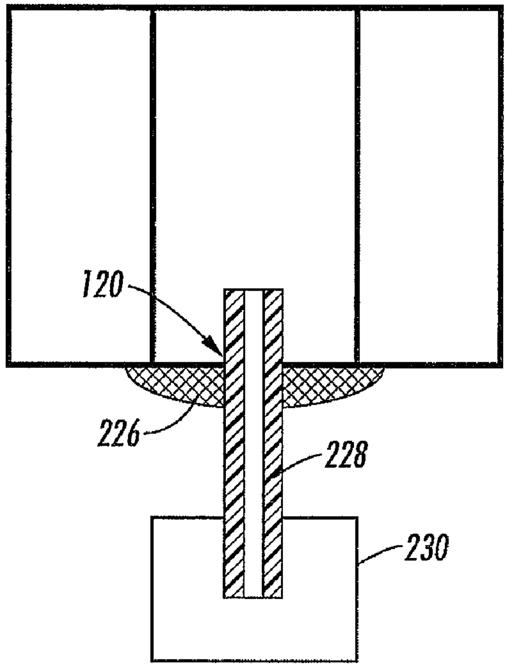
FIG. 13 illustrates yet another embodiment of valve2 of FIG. 2.

To further expand upon embodiments for valve2, attention is directed to FIGS. 11-13. In FIG. 11, valve2 210 includes a disc 212 rotatably associated with the exit end or extraction port end 120 of concentrate reservoir 112 (of FIG. 2). Rotating disc 212 includes a sealing member portion 214 and an aperture or opening 216, both of which are sized to correspond to an opening in extraction port end 120. During the concentration mode, the rotating disc is rotated such that the sealing member (e.g., Gore-Tex® is aligned with the aperture of extraction port 120. In this arrangement, the sealing member 214 inhibits any flow of sample fluid out of concentrate reservoir 112. Then when the processing moves to the extraction mode, rotating disc 212 is rotated such that opening 216 is aligned with the opening in extraction port 120 as illustrated in FIG. 11. This design allows the sample fluid to be extracted to a sample capture reservoir such as that in FIG. 2. In an alternative design, instead of a rotating disc 212, a linear sliding shutter mechanism with several openings may be employed.

FIG. 12 is a top view of a scheme where exit port 120 of concentrate reservoir 112 is configured with a phase change material 220 (e.g., a wax), plug 222 and heater element 224. To open valve2 (i.e., represented by phase change material 220, plug 222 and heater 224) heat is applied by heater 224 to phase change material 220, and plug 222 is removed, for example, by pressurizing the fluid inside the concentrate reservoir such as by the ink-jet approach. In this arrangement, the pressure causes plug 222 to become separated, thereby opening valve2.

FIG. 13, provides a top view of a design where a plug 226 is positioned at the extraction port. In this embodiment, capillary extraction tube 228 is inserted through polymer plug 226. Also provided is a pressure regulator 230 connected to a distant end of capillary 228. Pressure regulator 230 can be used for valve2 type operation, as well as aspirating fluid. In particular, pressure regulator 230 may, during the concentration mode, supply sufficient positive pressure to resist any fluid from being drawn into capillary 228. Then once the process moves to the extraction mode, pressure regulator 230 provides a lower or negative atmospheric pressure, thereby drawing fluid into capillary tube 228. Further and in connection with the agitation concepts of FIG. 2, as previously mentioned, the pressure regulator 230 of FIG. 12 may be used to agitate the sample solution prior to extraction. For example, by applying changing amounts of pressure to capillary 228, the fluid in concentrate reservoir is pumped back and forth in the concentrate reservoir prior to extraction.

Figure 14:
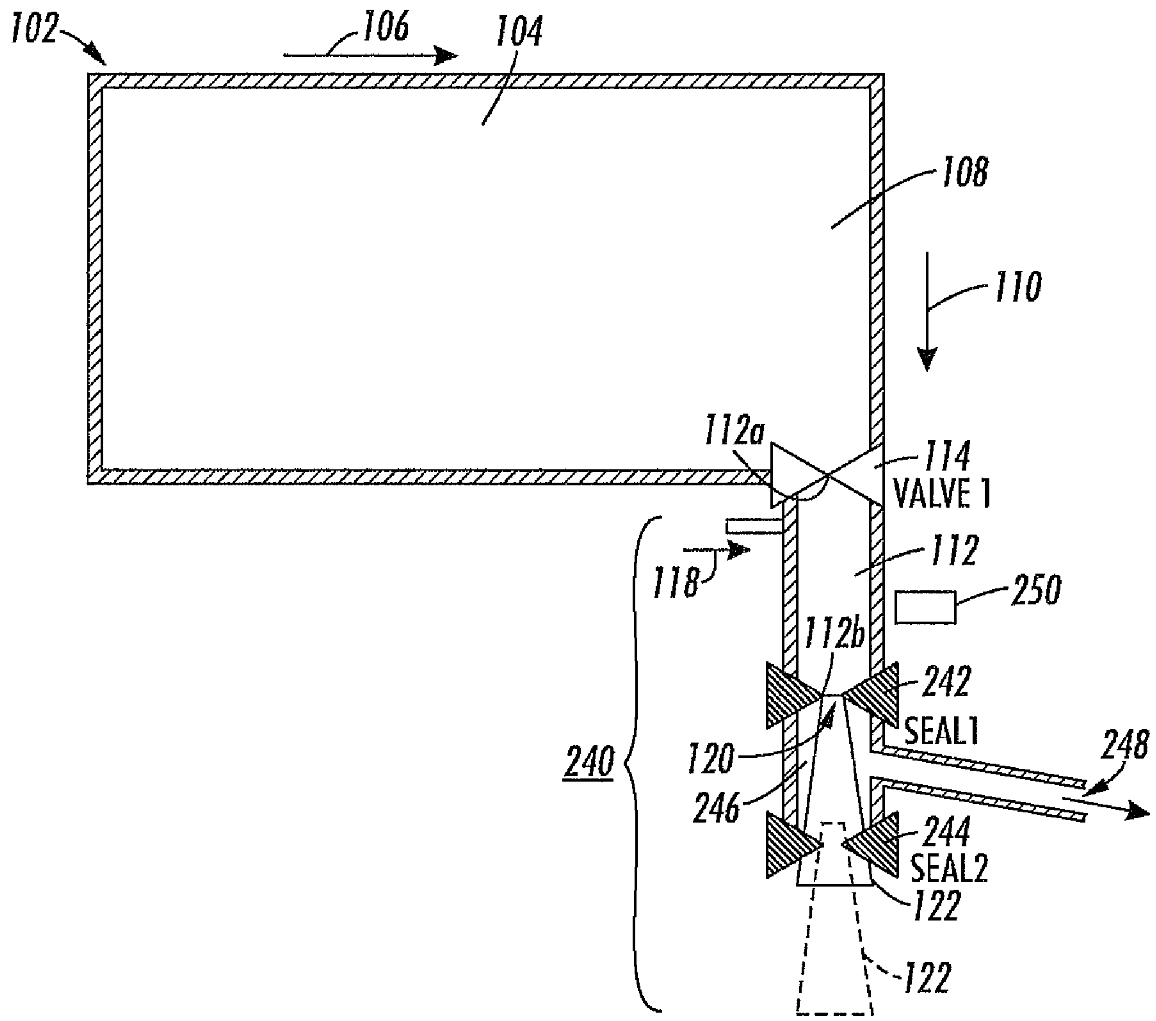
FIG. 14 sets forth another embodiment for an extraction mechanism in accordance with the concepts of the present application.

Turning attention to FIG. 14, illustrated is an extraction mechanism 240 in an alternative embodiment from the extraction mechanism of FIG. 2. More particularly, like numbered elements of FIG. 2 are similarly numbered here. Extraction mechanism 240 replaces valve2 with a multi-positional sample capture reservoir 122 between a seal1 242 and seal2 244. The area between seal1 242 and seal2 244 defines flushing chamber 246 having output flushing port 248. Optionally provided is concentration detector 250 configured by use of known detectors to determine an amount of particle concentration found within concentration reservoir 112. The detector may be an optical detector, such as a photo-diode that measures light absorption or fluorescence of the collected particles. It is to be appreciated other detectors may be used which employ alternative detection schemes. It is to be appreciated that the agitation mechanism 124 of FIG. 2 may be incorporated in this embodiment. Similarly, the detector 250 of this figure may be used in the embodiment of FIG. 2.

Figure 15A:
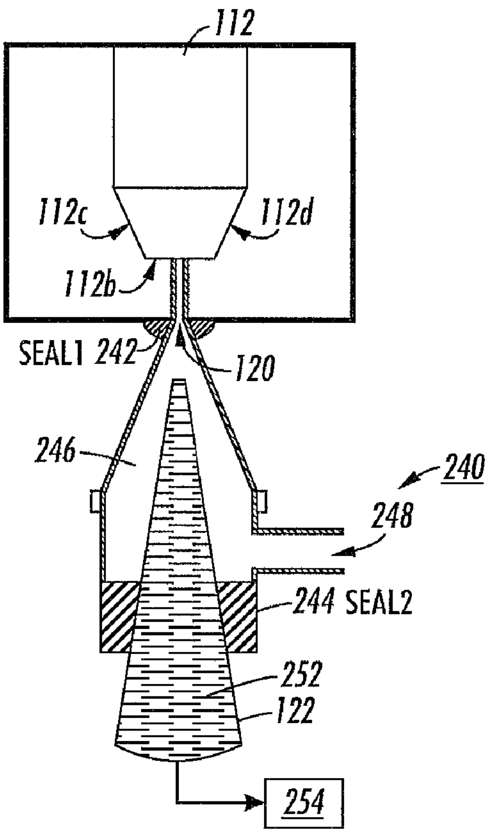
FIGS. 15A and 15B illustrate two modes of operation for the sample capture reservoir of FIG. 14.
Figure 15B:
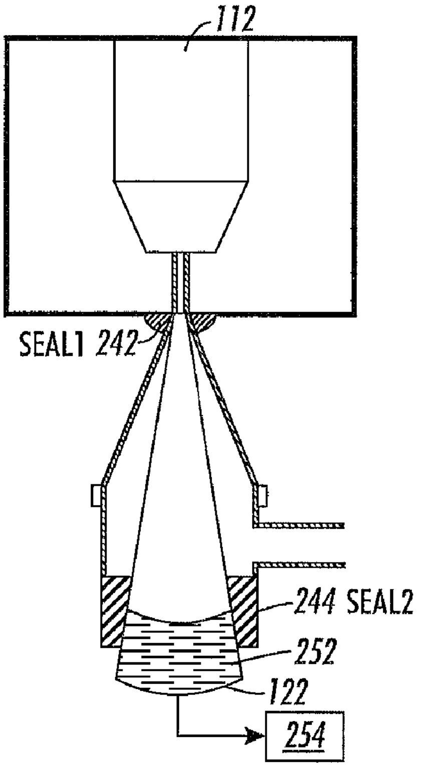

Turning to FIGS. 15A and 15B, set out is a more detailed view of a multi-positional configuration for sample capture reservoir 122. FIG. 15A depicts an arrangement when extraction mechanism 240 is in a flushing mode (e.g., priming mode), and FIG. 15B illustrates extraction mechanism 240 in an extraction mode. As shown here, seal1 242 provides a leak proof contact between the upper end of the flushing chamber 246 and extraction port 120. Seal 244 (seal2) is a self-sealing member whereby when sample capture reservoir 122 is removed, seal 244 provides a fluid-tight seal.

In the flushing mode of FIG. 15A, sample capture reservoir 122 is filled with a filling substance 252, and is therefore in a non-fluid accepting arrangement. As will be discussed more fully below, during the priming operation fluid from the concentrate reservoir is stopped from entering the interior of the sample capture reservoir by use of the filling substance. In this embodiment the filling substance is an oil, such as mineral oil. However, it is to be understood filling substance 252 may be any gas, liquid or solid substance (such as a plunger of a syringe) or other material known not to dilute or otherwise mix or allow dilution of the sample fluid within concentrate reservoir 112.

Concentrate reservoir 112 of FIGS. 15A and 15B is depicted in somewhat more detail than in FIG. 14. Specifically sidewalls 112*c* and 112*d* are inwardly angled resulting in opening 112*c* being smaller than opening 112*a* (see FIGS. 2 and 14). Angled sidewalls 112*c*, 112*d* are used to promote movement of the fluid and minimize the surface area and sharp corners to which particles may adhere.

A portion of sample capture reservoir (e.g., pipette tip, tube, etc.) 122 is shown connected to a device which is capable of extracting filling substance 252 at an appropriate time. In one embodiment, extracting device 254 may be a syringe or any other component which is capable of drawing the filling substance out of the sample capture reservoir.

Figure 16:
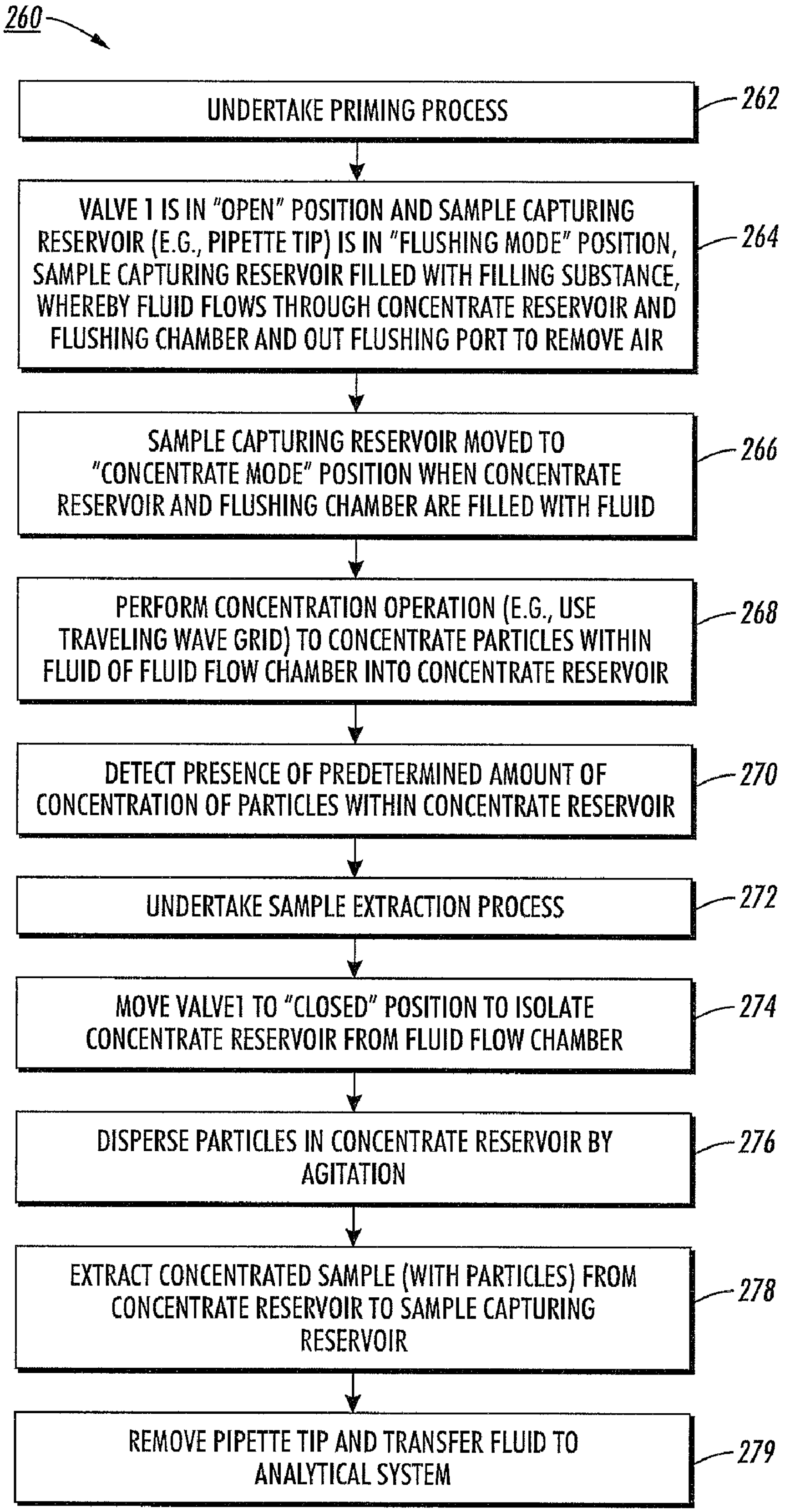
FIG. 16 is a process flow for operation of the extraction mechanism of FIG. 14.

Turning now to process flow 260 of FIG. 16, and with continuing attention to FIGS. 14, 15A and 15B, operational processes will be discussed.

The process is initiated with a priming operation (step 262). To perform the priming operation, valve1 is opened and the sample capture reservoir (e.g., pipette tip) is in the flushing mode position shown in FIG. 15A. At this time, the sample capture reservoir is filled with the filling substance such that fluid from the concentrate reservoir cannot enter the sample capture reservoir. With valve1 open, fluid flushes through the flushing chamber and out the flushing port. This priming operation continues until all air is removed from the concentrate reservoir as well as from the flushing chamber (step 264). Next, sample capture reservoir is moved into the extraction mode position of FIG. 15*b*, bringing the sample capture reservoir into operational contact with seal1 (step 266). At this point, the interior of the sample capture reservoir is filled with the filling substance, whereby no fluid within the concentrate reservoir moves into the sample capture reservoir or the flushing chamber. More particularly, movement of the sample capture reservoir causes the sample capture reservoir to act as a stop valve to the outflow of fluid from the concentrate reservoir.

At this point, particle concentration operations are undertaken (step 268), whereby particles in the fluid flow chamber are moved into the concentrate reservoir.

In an optional embodiment operation of the particle concentration operations continue until the presence of a certain preset amount of concentration of the particles is detected by the concentration detector (step 270). Once detection has occurred (or if the detector is not included in the process, after a desired time) the process moves to a sample extraction mode (step 272). In this portion of the process, valve1 is closed (step 274), to isolate the concentrate reservoir from the fluid flow chamber. Then, in another optional step, the particles in the concentrate reservoir may be agitated by an agitation mechanism (step 276). Following the optional agitation step, the fluid sample from the concentrate reservoir is extracted to the sample capture reservoir by aspiration. More particularly, in this embodiment, and as depicted in FIG. 15B, an extracting mechanism is used to withdraw the filling substance from the interior of the sample capture reservoir, thereby drawing in the concentrate sample from the concentrate reservoir (step 278). The aspiration continues until all or some other desired amount of the filling substance is removed from the sample capture reservoir and is replaced by the concentrate sample. Next, the sample capture reservoir is removed from the flushing chamber by moving it past seal2 (step 279). Seal2 is self-sealing, thereby holding any fluid within the flushing chamber once the sample capture reservoir is removed. The extracted sample capture reservoir is then provided to analytical devices/systems for further testing and experimentation.

Figure 17:
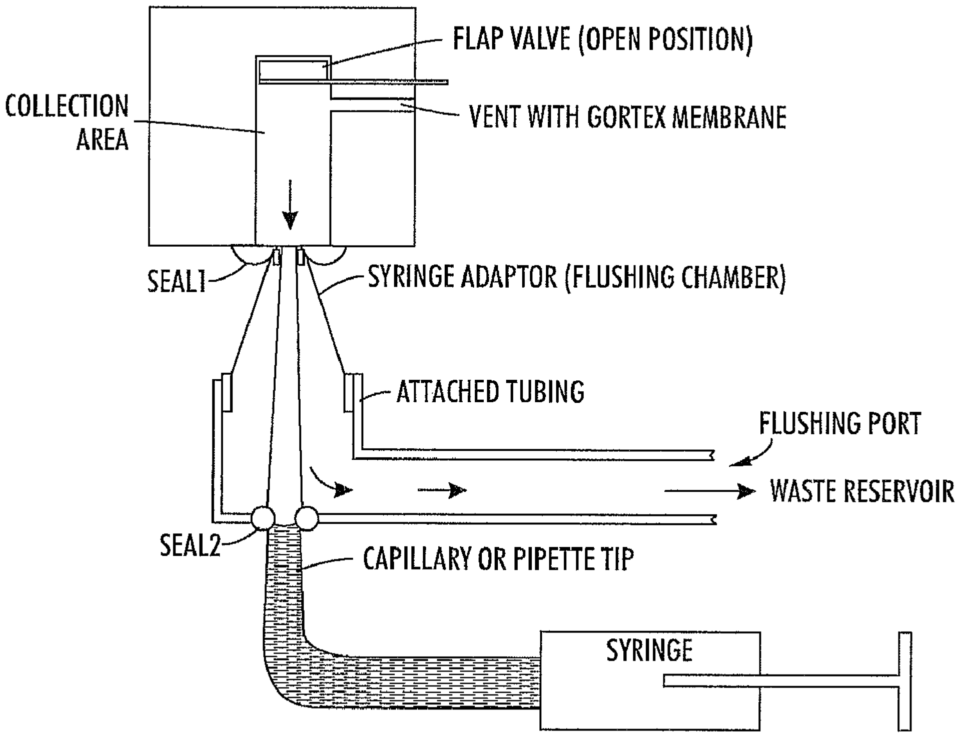
FIG. 17 shows a more fully detailed schematic of an embodiment employing the extraction mechanism of FIG. 14.

FIG. 17 shows a more detailed schematic of the entire extraction mechanism used to extract the concentrate sample.

Figure 18:
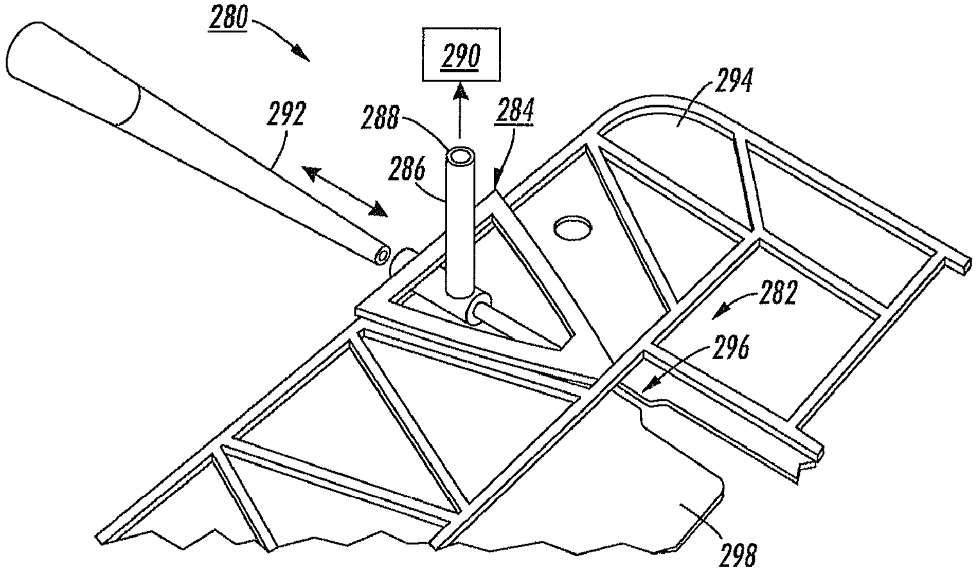
FIG. 18 depicts an embodiment of components for the extraction mechanism of FIG. 14.

FIG. 18 illustrates a partial view of a fluidic system with a particular embodiment of an extraction mechanism 280, and a partial concentrator area 282. Extraction mechanism 280 includes a manifold (e.g., made of silicone or other appropriate material) 284. The manifold 284 may be molded or formed by other appropriate process and is designed to include flushing chamber 286 and flushing port 288 which leads to waste reservoir 290. Particularly, fluid exiting the flushing port 288 is waste material provided to waste reservoir 290. Also included is a connection to sample capture reservoir 292, which in this embodiment is shown as a pipette tip. The extraction mechanism 280 is designed to provide the pipette tip in a two-position arrangement, such as discussed in connection with FIG. 14. Therefore, manifold 284 also includes the previously described valve1, along with seal1 and seal2, where seal2 is self-sealing when the pipette tip is removed. The triangular manifold 284 fits into a molded frame (e.g., made of polycarbonate or other appropriate material) 294 configured to hold a particle concentrator, which in this embodiment uses a traveling wave grid. More particularly, frame 294 includes particle concentrator area 298 which includes a concentrate reservoir area 298.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A particle extraction system for use with a particle concentrator, having a fluid flow chamber, which concentrates particles, the particle extraction system comprising:

a concentrate reservoir configured to hold 1.5 milliliters or less of fluid in which particles are concentrated, the concentrate reservoir in selective operative communication with the particle concentrator;

a valve mechanism configured and positioned to provide the selective operative communication between the particle concentrator and the concentrate reservoir; and an extraction arrangement configured and positioned to extract the particles from the concentrate reservoir wherein the extraction arrangement includes, a fluid path which extends between the concentrate reservoir and a flushing port, and a multi-positional sample capture reservoir filled with a filling substance which does not dilute or allow dilution of the concentrated sample, and positioned at least partially within the fluid path, wherein the multi-positions of the sample capture reservoir include a position during a particle concentration mode and a different position during a particle extraction mode.

2. The system according to claim 1, wherein the sample concentrator includes a traveling wave grid.

3. The system according to claim 2, wherein the concentrate reservoir is sized to hold 300 microliters of fluid.

4. The system according to claim 1, wherein the extraction arrangement includes a first seal and a second seal which selectively engage the sample capture reservoir, the second seal being a self-sealing member.

5. A method of extracting a concentrated sample of particles, the particles of the concentrated sample obtained from a particle concentrator having a fluid flow chamber, the method comprising:

configuring a concentrate reservoir to hold 1.5 milliliters or less of fluid and having a first end with an opening and a second end with an opening;

accumulating particles within the concentrate reservoir, the particles being obtained from the particle concentrator;

closing off the first end of the concentrate reservoir, isolating the concentrate reservoir from the fluid flow chamber of the particle concentrator;

agitating the concentrated sample to increase the amount of particles of the concentrated sample;

extracting the particles of the concentrated sample from the concentrate reservoir to a sample capture reservoir through the second end opening of the concentrate reservoir.

6. The method according to claim 5, wherein the particle concentrator includes a traveling wave grid.

7. The method according to claim 5, further including a step of priming the concentrate reservoir and removing of air from the concentrate reservoir during the priming, wherein the removing of air includes, venting the air from the concentrate reservoir via a venting mechanism in operative association with the concentrate reservoir.

8. The method according to claim 5, wherein the agitation step includes applying a varying amount of pressure into the concentrate reservoir to move the concentrate sample.

9. The method according to claim 5, wherein the step of extracting further includes aspirating the concentrated sample from the concentrate reservoir to the sample capture reservoir.

10. The method according to claim 5, wherein the step of extracting further includes pushing-out the concentrated sample from the concentrate reservoir to the sample capture reservoir.

11. The method according to claim 5, further including back-filling the concentrate reservoir with fluid during the extraction step, wherein the fluid is of a type which does not dilute the concentrated sample.

12. The method according to claim 11, further including, agitating concentrated sample in the concentrate reservoir to minimize adhesion loss thus increasing the amount of particles of the concentrated sample that are extracted to the sample capture reservoir.

13. A method of extracting a concentrated sample of particles comprising:

positioning a first end of an extraction mechanism into operational contact with an output of a concentrate reservoir, the extraction mechanism including (i) a fluid path extending from the concentrate reservoir to a flushing port, and (ii) a sample capture reservoir positioned at least partially within the fluid path;

configuring the sample capture reservoir in a non-fluid accepting arrangement, wherein fluid is unable to flow into the sample capture reservoir;

positioning the sample capture reservoir, in the non-fluid accepting arrangement, at a first position which maintains the fluid path from the first end to the flushing port unobstructed;

moving the sample capture reservoir to a second position wherein the fluid path is blocked;

performing particle concentration, wherein particles are concentrated in the concentrate reservoir;

isolating the concentrate reservoir from receiving additional particles;

reconfiguring the sample capture reservoir in a second fluid accepting arrangement; and extracting the particles in the isolated concentrate reservoir to the sample capture reservoir.

14. The method according to claim 13, wherein the configuring of the sample capture reservoir in the non-fluid accepting arrangement includes filling the sample capture reservoir with a filling substance, which does not dilute the concentrate sample.

15. The method according to claim 14, wherein the extracting step includes withdrawing the filling substance from the sample capture reservoir, and drawing in the concentrated sample containing the particles.

16. The method according to claim 13, further including, detecting the accumulation of particles in the concentrate reservoir, and ending the particle concentration operation.

* * * * *

UNITED STATES PATENT AND TRADEMARK OFFICE

CERTIFICATE OF CORRECTION

PATENT NO. : 7,771,580 B2
APPLICATION NO. : 11/468523
DATED : August 10, 2010
INVENTOR(S) : Jurgen H. Daniel et al.

It is certified that error appears in the above-identified patent and that said Letters Patent is hereby corrected as shown below:

In the Specifications:

Replace the paragraph at Col. 1, lines 8-12, with the following paragraph:

This invention was made with Government Support under Contract No. W911NF-05-C-0075 awarded by the U.S. Army. The Government has certain rights in this invention.

Signed and Sealed this
Thirteenth Day of August, 2013

Teresa Stanek Rea
*Acting Director of the United States Patent and Trademark Office*